| (12) | United States Patent | (10) Patent No.: | US 11,759,903 B2 |
|---|---|---|---|
| | Judas | (45) Date of Patent: | Sep. 19, 2023 |

(54) MACHINE TOOL

(71) Applicant: ESA Eppinger GmbH, Denkendorf (DE)

(72) Inventor: Joel Judas, Unterensingen (DE)

(73) Assignee: ESA EPPINGER GMBH, Denkendorf (DE)

( * ) Notice: Subject to any disclaimer, the term of this patent is extended or adjusted under 35 U.S.C. 154(b) by 928 days.

(21) Appl. No.: 16/734,985

(22) Filed: Jan. 6, 2020

(65) Prior Publication Data

US 2020/0215621 A1   Jul. 9, 2020

(30) Foreign Application Priority Data

Jan. 8, 2019  (DE) ..................... 10 2019 100 257.5

(51) Int. Cl.
 *B23Q 3/155*   (2006.01)
 *B23B 29/20*   (2006.01)
 *B23B 29/24*   (2006.01)

(52) U.S. Cl.
 CPC .......... *B23Q 3/15513* (2013.01); *B23B 29/20* (2013.01); *B23B 29/242* (2013.01); *B23Q 2003/15586* (2013.01); *B23Q 2003/155404* (2016.11); *B23Q 2220/002* (2013.01); *Y10S 483/902* (2013.01); *Y10T 483/1719* (2015.01)

(58) Field of Classification Search
 CPC ............. Y10T 82/2506; Y10T 82/2508; Y10T 483/1719; Y10T 483/1721; Y10S 483/902; B23Q 3/15513; B23Q 3/15553; B23Q 2003/155404; B23Q 2003/15586; B23B 29/20; B23B 29/205; B23B 29/246; B23B 29/34

USPC ............... 483/24, 25, 902; 82/120, 121, 159
 See application file for complete search history.

(56) References Cited

U.S. PATENT DOCUMENTS

| 4,414,724 | A | * | 11/1983 | Garnett | .............. | B23Q 3/15506 |
| | | | | | | 82/160 |
| 4,641,413 | A | * | 2/1987 | Hallqvist | ............... | B23Q 7/046 |
| | | | | | | 82/125 |
| 5,044,063 | A | * | 9/1991 | Voellmer | ........... | B23Q 3/15553 |
| | | | | | | 483/902 |
| 10,974,356 | B2 | * | 4/2021 | Terada | ............... | B23Q 17/0904 |
| 2011/0023276 | A1 | * | 2/2011 | Jansen | .................... | B23B 29/20 |
| | | | | | | 82/159 |
| 2011/0094355 | A1 | * | 4/2011 | Sheehy | ................. | B23B 29/205 |
| | | | | | | 82/159 |

(Continued)

FOREIGN PATENT DOCUMENTS

| DE | 19940330 A1 | 3/2001 |
| DE | 102014119482 A1 | 6/2016 |

(Continued)

*Primary Examiner* — Erica E Cadugan
*Assistant Examiner* — Michael Vitale
(74) *Attorney, Agent, or Firm* — Fitch, Even, Tabin & Flannery LLP (57) ABSTRACT

In a machine tool having a tool carrier (1) that comprises at least one receptacle (4) for a tool holder (3) for driven or stationary tools a tool change device is provided that comprises gripping means (370) for gripping the tool holder (3) at the housing (7) or at part (71) connected with the housing (7). In addition to the gripping means the tool change device comprises a device for actuating the fastening means that are configured for attachment of the tool holder at the tool carrier.

11 Claims, 11 Drawing Sheets

(56) References Cited

U.S. PATENT DOCUMENTS

| | | | |
|---|---|---|---|
| 2012/0131809 A1* | 5/2012 | Sahm | B23B 29/20 |
| | | | 33/645 |
| 2013/0157825 A1* | 6/2013 | Beck | B23B 29/242 |
| | | | 82/159 |
| 2014/0196583 A1* | 7/2014 | Judas | B23B 29/205 |
| | | | 82/121 |
| 2016/0175943 A1 | 6/2016 | Judas et al. | |
| 2020/0254575 A1* | 8/2020 | Giesler | B23B 29/242 |

FOREIGN PATENT DOCUMENTS

| | | | | |
|---|---|---|---|---|
| EP | 0215228 A2 | * | 3/1987 | |
| EP | 3771510 A1 | * | 2/2021 | ........... B23B 29/046 |
| GB | 2021466 A | * | 12/1979 | ............. B23B 3/161 |
| JP | 58149151 A | * | 9/1983 | ......... B23Q 3/15553 |
| JP | 59214534 A | * | 12/1984 | |

\* cited by examiner

Figure 23:
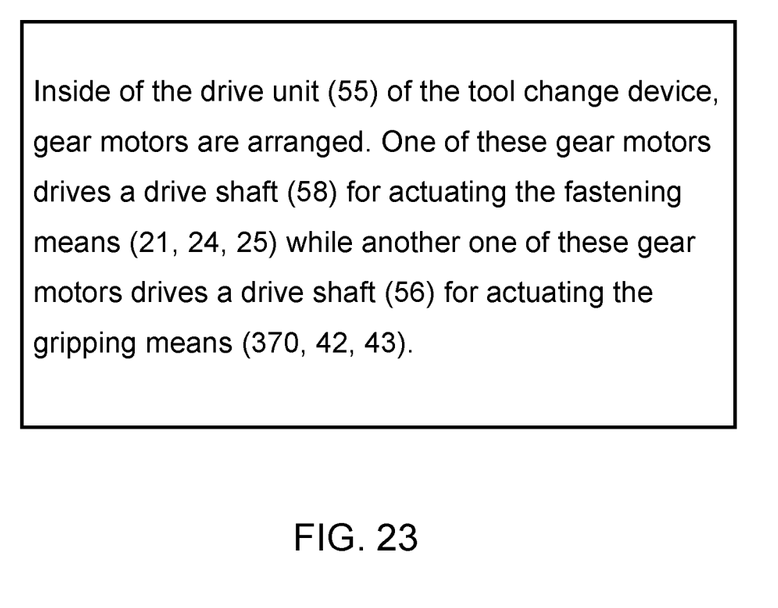
FIG. 23 is a text box which advises that gear motors are arranged inside of the drive unit of the tool change device, and one of these gear motors drives a drive shaft for actuating the fastening means while another one of these gear motors drives a drive shaft for actuating the gripping means.

Inside of the drive unit (55) of the tool change device, gear motors are arranged. One of these gear motors drives a drive shaft (58) for actuating the fastening means (21, 24, 25) while another one of these gear motors drives a drive shaft (56) for actuating the gripping means (370, 42, 43).

FIG. 23

MACHINE TOOL

RELATED APPLICATION(S)

This application claims the benefit of German Patent Application No. 10 2019 100 257.5, filed Jan. 8, 2019, the contents of which are incorporated herein by reference as if fully rewritten herein.

TECHNICAL FIELD

The invention refers to a machine tool, a tool change device for such a machine tool and a tool holder suitable therefor.

BACKGROUND

Machine tools, e.g. in the form of lathe, milling machines, lathe centers or milling centers etc. that comprise a tool carrier, e.g. in the form of tool turrets are used in diverse embodiments. The tool carrier that can also be configured for linear movement typically carries a number of receptacles for tool holders for driven or stationary tools that are inserted in the respective receptacle in a pre-defined orientation of a tool fixed in the tool holder and that are releasably attached at the tool carrier in correct positional arrangement.

For this tool clamping arrangements are used as, for example, described in DE 199 40 330 A1 or in DE 10 2014 119 482 A1. Tool holders comprise a housing to which fixing means for fixing the tool holder at the tool carrier are assigned. Tool holders with a cylinder shank at the housing are standardized according to DIN 69880. They can be configured for stationary or rotating tools.

It is also known from the mentioned document DE 199 40 330 A1 to provide the tool holder with a mounting flange that abuts against the tool carrier and is fixedly screwed thereto, if the tool holder is inserted in the receptacle of the tool carrier, such that the tool holder is rigidly connected with the tool carrier.

Particularly during the machining of smaller lot sizes, a more frequent tool change is required. For this in a lathe the tool holders are typically manually changed, which requires a remarkable amount of care and attention from the operating personnel in order to guarantee that the tool holders are attached on the respective receptacle of the tool carrier in the exact and correct positional arrangement and with precise orientation of their tools. In order to reduce the relatively long set-up times for the tool change that result therefrom, the tool clamping device known from DE 10 2014 119 482 A1 is configured, such that the devices for attaching the respective tool holder on the tool carrier comprise at least two tie rods extending orthogonal to the contact surface of the tool holder that are arranged with distance to each other at the tool holder, whereas a clamping device is provided at the tool carrier that is configured to engage the tie rods and to apply an axial tensioning or clamping force thereon, if the tool holder is inserted into the receptacle. The clamping device comprises activating means by which the clamping device is controllable in the sense of pressing the two contact surfaces of the tool holder and the tool carrier against each other due to the created axial tensioning or clamping force when engaging the at least two tie rods. Because the clamping device comprises two clamping elements for each tool holder that are shiftably guided in the tool carrier and that have the form of clamping rods that are connected with each other via a clamping bar, it is sufficient for changing the tool holder to actuate only one single clamping screw that is accessible from outside of the tool carrier and the tool holder.

In practice it is known to use a quick change system, e.g. in CNC lathe that allows, instead of the manual tool change, to automatically exchange the individual tool holders of the tool carrier, e.g. a turret, wherein this exchange can also be carried out by a robot.

This quick change system operates with a clamping system for the tool holder arranged inside the tool carrier, i.e. the turret, and thus requires specific constructive provisions in the tool carrier. This means that a retrofit of machine tools with present tool carriers is not possible or only possible with remarkable efforts. Because the clamping system in the turret is separated from a gripping system gripping the housing of the respective tool holder, also an increased effort for the elements results that contribute to the tool change process.

Thus a requirement exists to provide a possibility that allows a quick, automatic, operational reliable tool change in machine tools that are equipped with a tool carrier, e.g. in the form of a tool turret that comprises at least one receptacle for the at least one tool holder for driven or stationary tools that can be simply removed from a respective receptacle during a tool change and can be subsequently replaced by another tool carrier.

SUMMARY

To solve this object the machine tool according to the invention comprises the features as described herein.

An inventive tool change device that is suitable for use with such a machine tool is also disclosed herein, as is a tool holder configured according to the invention for use in such a machine tool or such a tool change device.

The new machine tool is equipped with a tool change device that comprises gripping means for gripping the respective tool holder at its housing or at a part connected therewith and that is configured to replace the tool holder released from the tool carrier by another tool holder and to insert it in the assigned receptacle of the tool carrier in correct positional alignment. In doing so, the tool change device comprises a device for actuating fastening means of the tool holder at the tool carrier in addition to the gripping means.

The gripping means and the device for actuating the fastening means are integrated in a first unit in a preferred embodiment. Drive means that are integrated in a second unit can be assigned to the gripping means and to the device for actuating the fastening means, wherein the two units are preferably releasably connected with each other. At least one of the units can comprise means for coupling with a handling or movement or manipulator device, e.g. a robot. In doing so, particularly simple and operation-reliable conditions are obtained, if the gripping means and the device for actuating the fastening means are configured as being mechanically effective.

In that the gripping means are integrated with the device for actuating the fastening means in the tool change device, simple construction conditions are obtained that allow a simple adaption or refitting of existing machines without requiring particularly cumbersome constructive measures, e.g. in the inside of the tool carrier.

If the gripping means and the device for actuating the fastening means of the respective tool holder are integrated in a first unit with which a second unit is releasably connected comprising drive means for the first unit, a particular flexibility results for the use of the machine tool or its tool change device. Namely due to a simple exchange, particularly of the gripping unit, different tool holders that respectively require specific gripping means can be used without cumbersome refitting measures.

The new tool change device is accordingly configured in a way that it comprises a device for actuating the fastening means of tool holders or of other additional devices for machine tools and for other machining centers in addition to the gripping means. Also the gripping means and the device for actuating the fastening means are integrated in a first unit in the tool change device. Drive means are assigned thereto that are integrated in a second unit, wherein the two units are particularly releasably connected with each other. At least one of the units can comprise means for coupling with a handling or moving device, e.g. a robot or a compound slide etc. Thus the tool change device can be used in a universal and flexible manner as already mentioned, wherein it can be differently combined with regard to the requirements of the respective task in a simple manner.

The unit comprising the drive means usually comprises several individually controllable drive units, e.g. in the form of gear motors that are controlled and monitored by a control according to the purpose. The control can coordinate the procedure of a tool change process with the machine in order to avoid disturbances, e.g. collisions and to guarantee a trouble-free quick tool change.

A new tool holder that is particularly suitable for use in the new machine tool and in the new tool change device is configured such that at its housing or at a part connected therewith gripping locations for gripping means of a tool change device are provided to which a device is preferably assigned configured for positioning the housing in a predefined orientation on a storage. Thus, the tool holder comprises a defined interface at which the gripper of the gripping means can grip it reliably and in correct positional arrangement. In a preferred embodiment the gripping locations can provide groove-like depressions that are configured for engagement of gripping jaws of the gripping means, while other projections or depressions for cooperation with positioning elements provided at the storage can be brought into engagement in order to guarantee an exactly positioned deposition of the respective replaced tool holder.

Additional advantageous features and configurations of the new machine tool, the new tool change device and the new tool holder are subject of dependent claims.

BRIEF DESCRIPTION OF THE DRAWINGS

In the drawing embodiments of the subject matter of the invention are illustrated. The drawings show.

DETAILED DESCRIPTION

Figure 1:
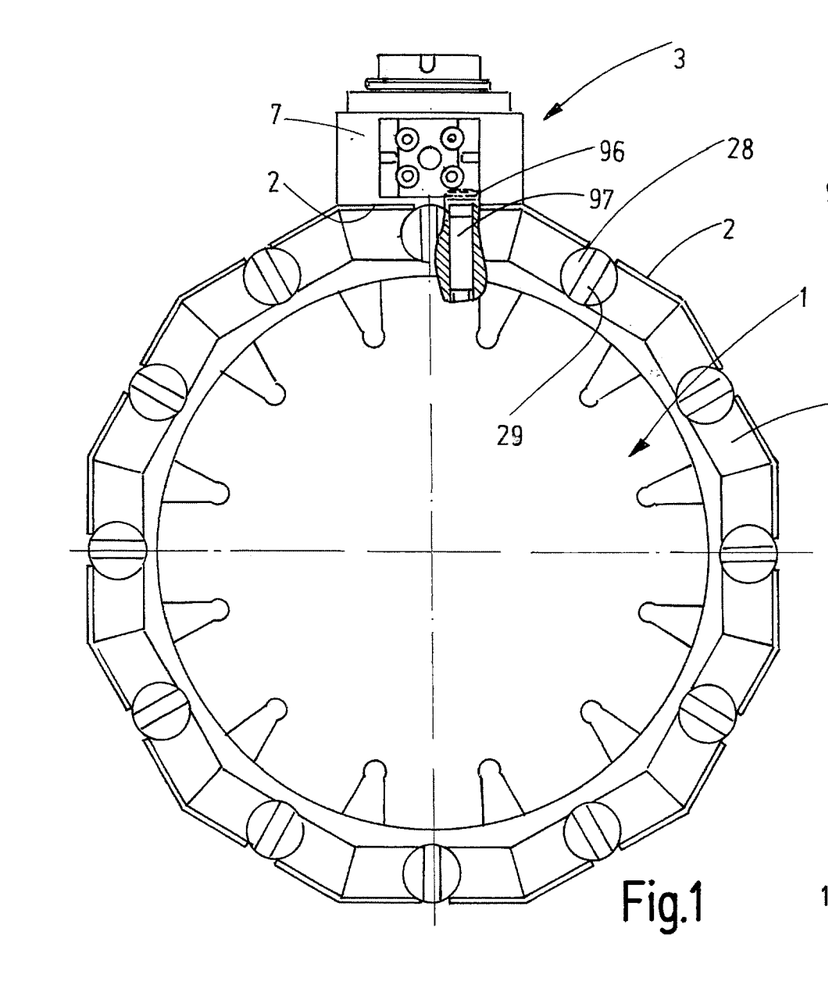
FIG. 1 a tool carrier in the form of a star turret disc of a machine tool according to the invention with an attached tool holder in a side view and in a schematic illustration, FIG. 2 the arrangement of FIG. 1 in a side view turned about 90°, FIG. 3 the tool holder of the arrangement according to FIG. 1 in a perspective schematic illustration and in another scale, FIGS. 4 and 5 the clamping device of the tool holder according to FIG. 3 in a perspective model-like illustration with view onto the lower side of the tool holder respectively while illustrating the released and clamped condition, FIG. 6 the tool holder of FIG. 3 in the condition in which it is attached to the tool carrier while illustrating a gripper unit that is an engagement with the tool holder and the tool carrier in a schematic perspective illustration with removed housing cover, FIG. 7 the arrangement of FIG. 6 in a view from the bottom, FIG. 8 the arrangement of FIG. 6 in a side view with partly cut tool carrier, FIG. 9 the arrangement of FIG. 6 in a top view, FIG. 10 the arrangement of FIG. 6 in an axial portion and with a drive unit attached to the gripper unit in a side view, FIG. 11 the arrangement of FIG. 10 illustrating the gripper unit in a sectional illustration in top view, FIG. 12 the arrangement of FIG. 10 in another longitudinal sectional illustration of the gripper unit and in a respective side view, FIG. 13 the arrangement of FIG. 11 cut along the line XIII-XIII in FIG. 11 in a side view, FIG. 14 the arrangement of FIG. 10 cut along the line XIV-XIV in FIG. 10 in a side view, FIG. 15 the gripper unit of the arrangement according to FIG. 10 in a top view onto the gripper face of the gripper unit, FIGS. 16, 17 a coupling of the gripper unit according to FIG. 9 in a partly cut top view and cut along the line XVII-XVII in FIG. 16 in a side view and FIG. 18 the tool holder of FIG. 3 onto a storage in a perspective schematic illustration, FIGS. 19-22 a machine tool according to the invention with an assigned tool change device according to the invention illustrating different phases of the tool change process in a respective side view and in schematic illustration.
Figure 2:
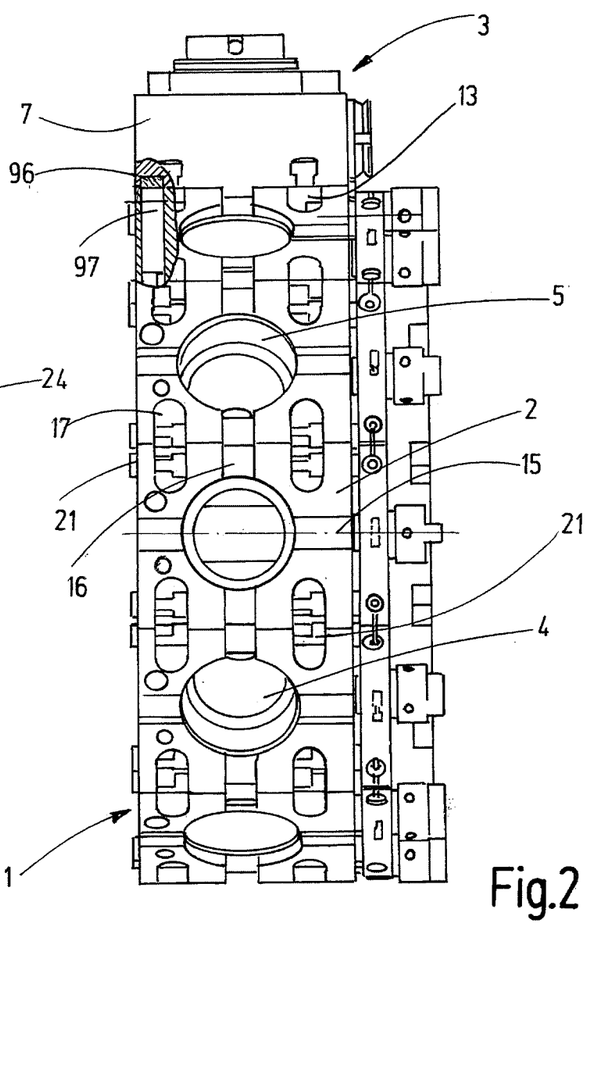

In FIGS. 1, 2 a tool carrier 1 in the form of a turret disc is illustrated that is part of a tool star turret that is not further illustrated with radially arranged tools. The tool carrier 1 is configured as regular polygon and carries at its circumference planar contact surfaces 2 for two holders, one of which is schematically illustrated at numeral 3 with its contour and is perspectively illustrated in further detail in FIG. 3. In the area of each contact surface 2 the tool carrier 1 is provided with a radially orientated cylindrical reception bore 4 that is particularly apparent in FIG. 2 that is configured as step bore with a cylindrical section 5 adjoining the contact surface 2 and that forms a receptacle for a tool holder 3. As it can be seen, e.g. in FIG. 3, the tool holder 3 comprises a cylindrical shaft 6 that is accommodated in the assigned reception bore 4 or in its cylindrical section 5 respectively, if the tool holder 3 is inserted in the tool carrier 1. The shaft carries a housing 7 in which a spindle 8 is rotatably supported that is coaxial relative to the shaft 6. The spindle 8 is formed at one of its ends with a coupling 9 for a drive source provided in the area of a tool carrier and is provided at its other end with a collet 10 for clamping a tool illustrated at numeral 11, e.g. a drill or a milling tool. The housing 7 has substantially the shape of a parallelepiped and is configured, such that a flange section extending sideward beyond the shaft 6 with a planar contact surface 12 is obtained, with which the tool holder inserted in receptacle of the tool carrier 1 abuts against the contact surface 2 of the tool carrier 1. In the region of the contact surface 12 four tie rods 13 are provided that are preferably arranged in the proximity of the four corners of the rectangular contact surface 12.

At the housing 7 of the tool holder 3 four positioning elements in the form of sliding blocks 14 (compare FIGS. 3-5) are additionally provided that are arranged about the axis of the shaft 6 in a regularly distributed manner. As particularly apparent from FIG. 2, two reception grooves 15, 16 are provided in the area of each of its contact surfaces 2 that have rectangular cross-section and parallel flanks and that intersect orthogonally in the area of the reception bore 4, such that the intersection point of the groove axes is located on the axis of the reception bore 4. If the tool holder 3 abuts with its contact surface 12 against the contact surface 2 of the tool carrier 1 and is fastened at the tool carrier 1 by means of the tie rods 13, the four sliding blocks 14 of the tool holder are accommodated with small tolerances in the reception grooves 15, 16 that can also be called feather key grooves, such that the attached tool holder 3 is connected with the tool carrier 1 exactly in the correct positional arrangement with precise orientation of its tool 11.

The respectively geminately opposed tie rods 13 extend over the contact surface 12 of the tool holder 3. Openings 17 are assigned thereto in the area of the contact surface 2 of the tool carrier 1 in which the tie rods 13 extend with a clamping part 18, if the tool holder 3 is placed on the tool carrier. The clamping part 18 is configured bifurcated with two limbs that define a through-opening 19 (FIG. 3) between themselves. In the two limbs of the clamping part 18 the same face in the side view substantially triangular or trapezoidal cutouts are provided that are limited by a wedge surface 20 respectively at its lower side.

Figures 4, 5:
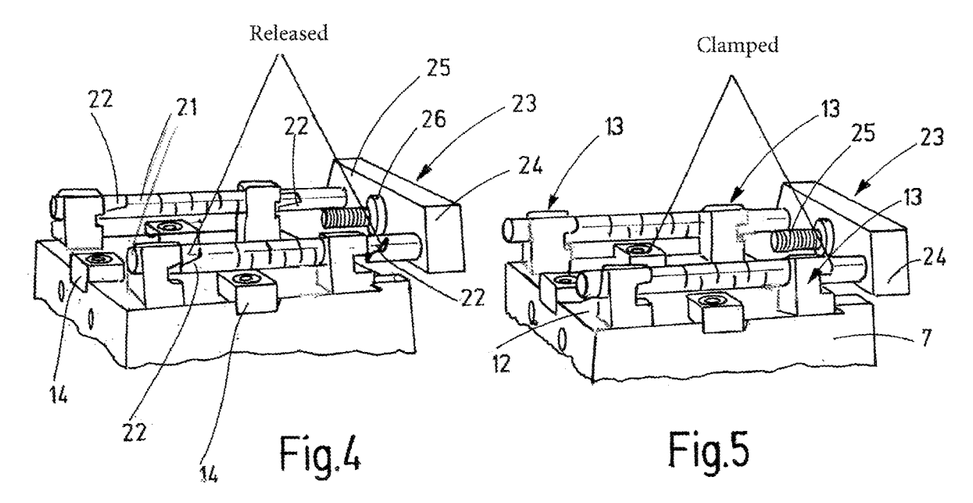
Figure 8:
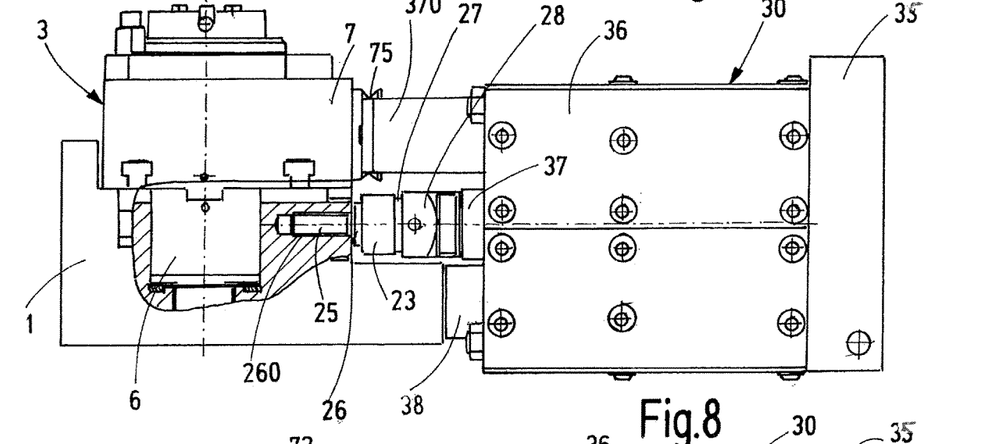

At the tool carrier 3 a clamping device is provided that is particularly apparent from FIGS. 4, 5 and 8, that engages at the tie rods 13 and exerts an axial clamping force thereon under the effect of which the tool carrier 3 is pressed against the contact surface of the tool carrier 1 with a high force that is necessary for supporting the machining forces, if the tool holder 3 is inserted into the receptacle of the tool carrier 1.

The clamping device that forms one part of the fastening means for fastening the tool holder 3 at the tool carrier 1 comprises clamping elements that are moveably guided in respective bores of the tool carrier 1 and that are configured as clamping rods 21. The clamping elements or clamping rods 21 respectively can be adjusted between an effective position according to FIG. 5 in clamping engagement with the clamping parts 18 of the respectively assigned tie rods 13 of a tool holder 3 placed on the tool carrier 1 and a rest position according to FIG. 4 releasing the assigned tie rods 13 by means of assigned activating means. Each of the tension bars 21 is provided with two similarly configured wedge surfaces 22 that come in engagement with the respective wedge surfaces 20 of the respective tie rod and that can cooperate therewith in the manner of a wedge gear for creating the axial clamping force, as it is readily comprehensible from FIGS. 4, 5.

Figure 9:
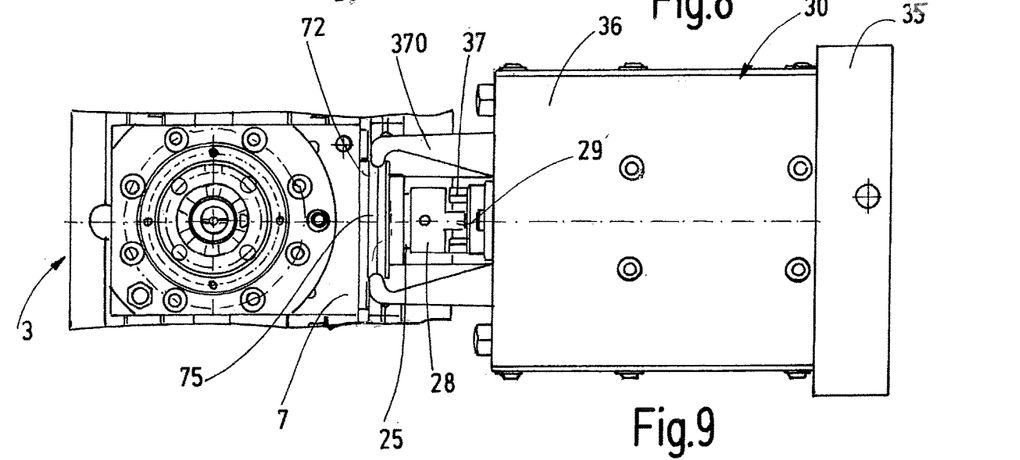
Figures 15, 16, 17, 18:
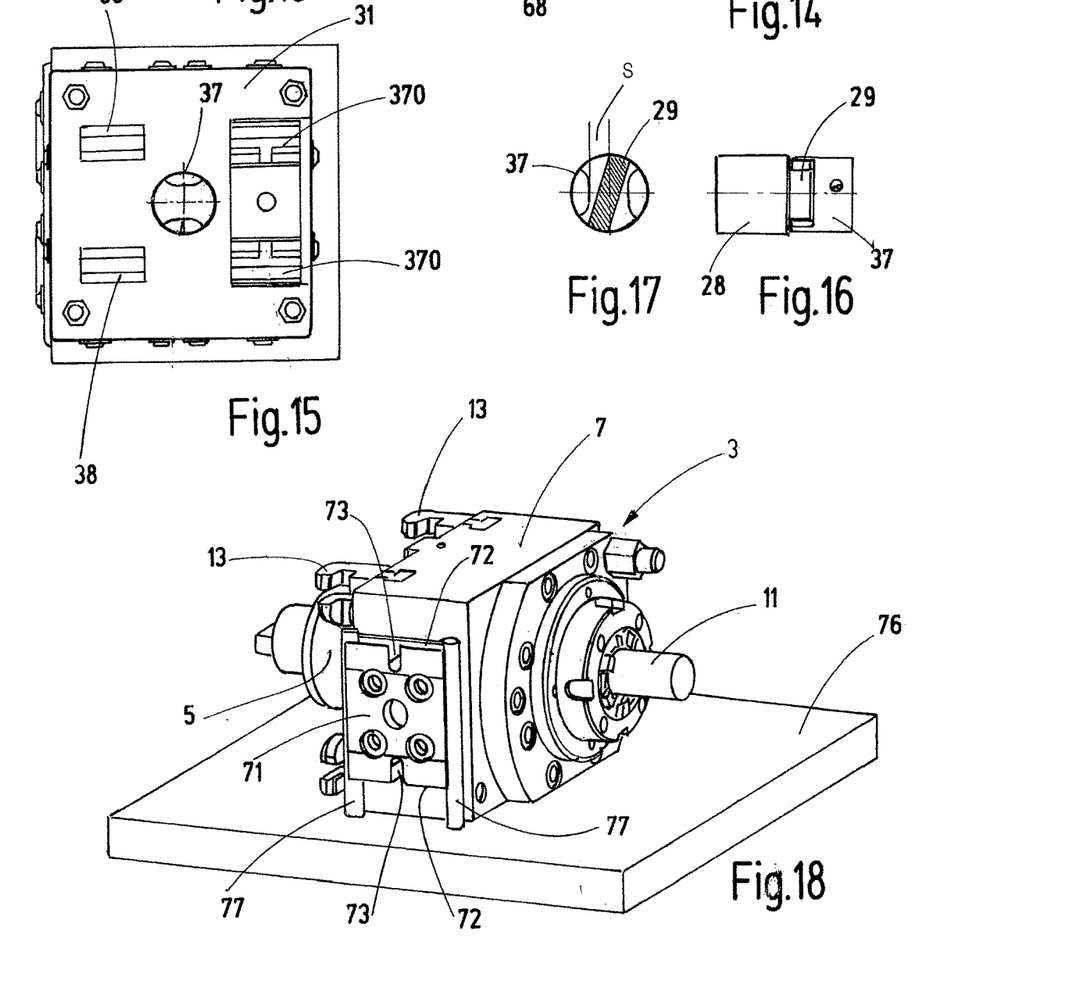
Figure 19:
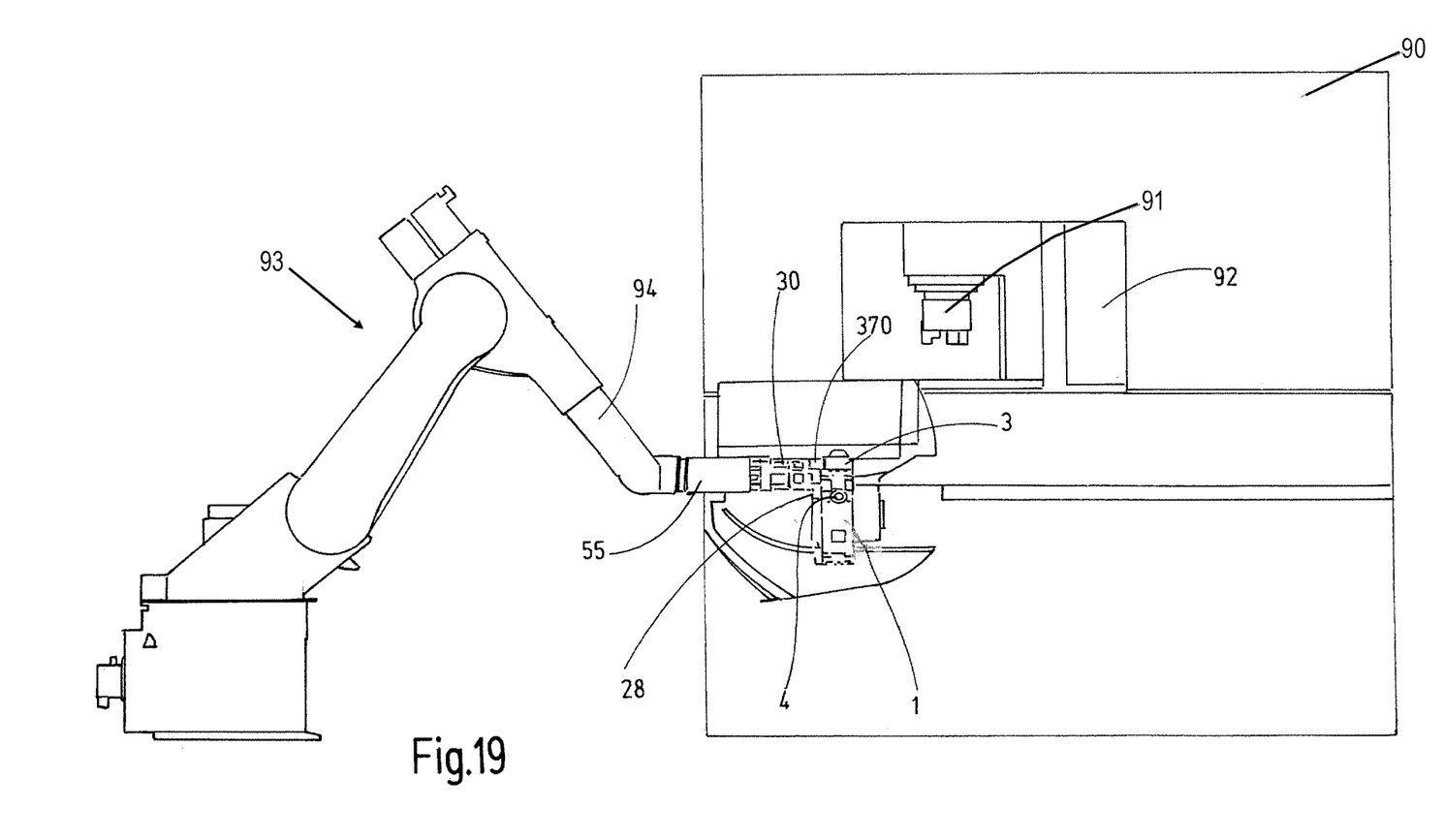

The discussed clamping device of the fastening means for the respective tool holder 3 comprises actuating means 23 (FIGS. 4, 5). An actuating element accessible from outside the tool carrier 1 in a manner as apparent from FIGS. 1 and 2 and having the form of a dimensionally stable clamping bar 24 forms part of the actuating means 23. For each tool holder 3 two assigned clamping rods 21 are connected respectively with the clamping bar 24. The clamping bar 24 is supported against the tool carrier 1 by a rotating element in the form of a clamping screw 25. A clamping screw 25 that extends through a through-bore of the clamping bar 24 is supported against the clamping bar 24 in both axial directions by means of a thrust bearing disc 26 (FIGS. 4, 5 and 8) on one side and by a screw head 27 on the other side. On the screw head 27 a coupling piece 28 is attached in a torque-proof manner (FIGS. 8, 9) that carries at the free end face a transverse extending coupling bar 29 (FIGS. 16, 17).

As apparent, e.g. from FIG. 1, a clamping bar 24 with a clamping screw 25 is assigned to each of the contact surfaces 2 of the tool carrier, wherein the clamping rods adjoining each other have a substantially trapezoid shape. The clamping rods 21 that are connected in pairs respectively with the clamping bars 24 extend through bores that cross the opening 17 of the tool carrier 1, as it can be seen in FIG. 2.

The function of the described arrangement is as follows: During normal operation, i.e. during the machining of a workpiece the clamping screw 25 of the tool holder 3 that is placed on the assigned contact surface 2 of the tool carrier 1 is tightened, such that the housing 7 of the tool holder is exactly and in correct positional arrangement clamped with the tool carrier 1 by the four tie rods 13 and the clamping rods 21. During a tool holder change the tool carrier 1 is rotated in an angular position suitable for the tool holder change. Subsequently, the assigned clamping screw 25 is rotated in a release sense via the coupling piece 28 accessible at the outer side of the tool carrier 1, whereby the clamping bar 24 is lifted from the tool carrier 1 by the thrust bearing disc 26 and the clamping rods 21 are pulled back in the released position according to FIG. 4. Thus the tie rods 13 of the tool holder 3 are released and the tool holder 3 can be unimpededly lifted from the tool carrier 1. During insertion of a new tool holder 3 this process progresses in a reverse sense. That means the tool holder 3 is shifted into the reception bore 4 with its shaft 6 and its contact surface 12 is brought into contact with the contact surface 2 of the tool carrier 1. Then the clamping screw 25 is rotated in a clamping sense until the clamping condition is reached that is illustrated in FIG. 5 and the new tool holder 3 is fixed in the correct positional arrangement on the tool carrier 1.

The actuation of the clamping screws 25 during a tool holder change can be basically carried out manually by means of a suitable tool, e.g. a wrench, as it is described in detail in DE 2014 119 482 A1 to which reference is made herein with regard to the details. In order to avoid the drawbacks associated with a manual tool holder change and in order to remarkably decrease the relatively long set-up times resulting therefrom, according to the invention the following measures are taken:

An automatic tool change device is assigned to the machine tool that comprises gripping means for gripping the tool holder at the housing 7 of the tool holder 3 or a part connected therewith and that is configured to automatically replace the tool holder 3 released from the tool carrier 1 by another tool holder and to insert it in the reception bore 4 in correct positional arrangement, wherein for this constructive modifications at the described tool carrier or even its replacement is not necessary.

Figure 3:
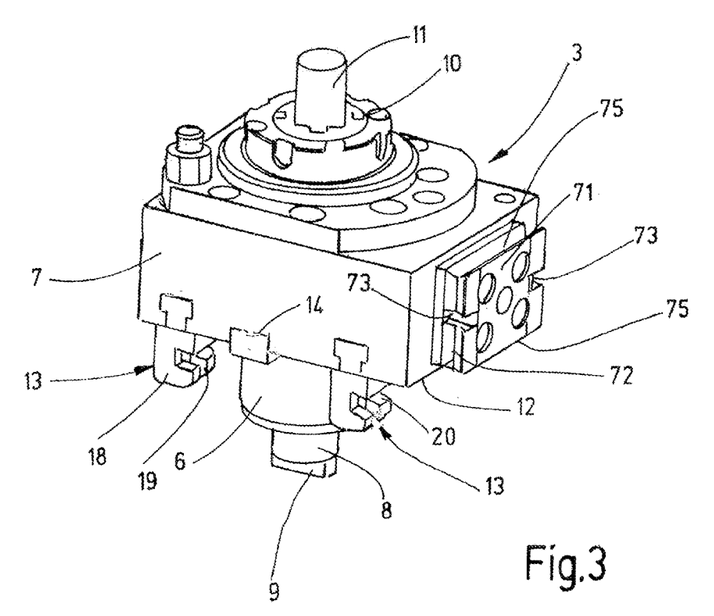
Figure 6:
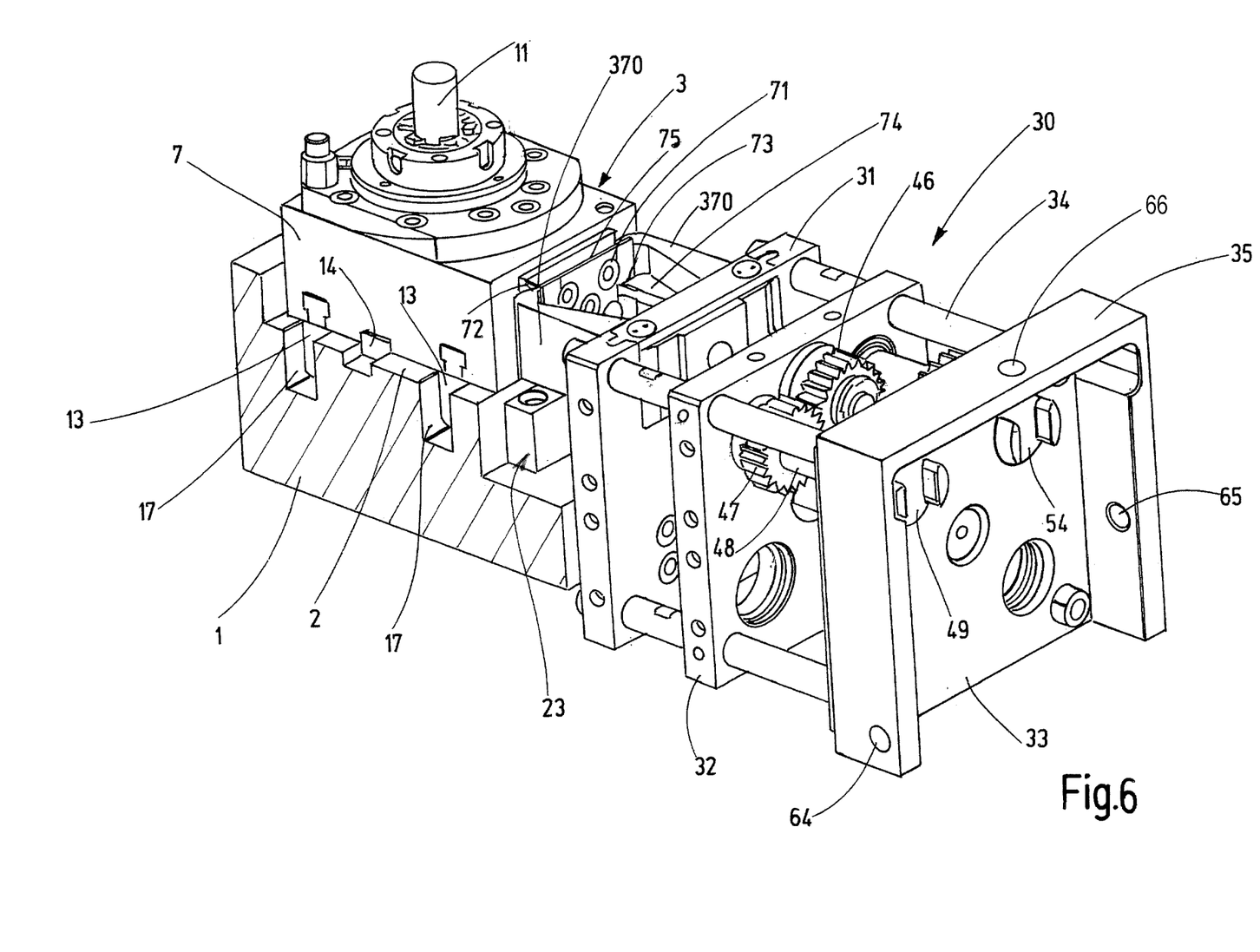

For this the tool change device comprises a device for actuating the fastening means 21, 24, 25 for the tool holder 3 in addition to the gripping means:

FIG. 6 shows in a pure schematic perspective illustration a section of the tool carrier 1 on the contact surface 2 of which a tool holder according to FIG. 3 is placed with its tension bars 13 extending through opening 17 and locked in a manner apparent from FIG. 5 by not further illustrated clamping rods 21 that are connected in pairs with the clamping bar 24.

Figure 7:
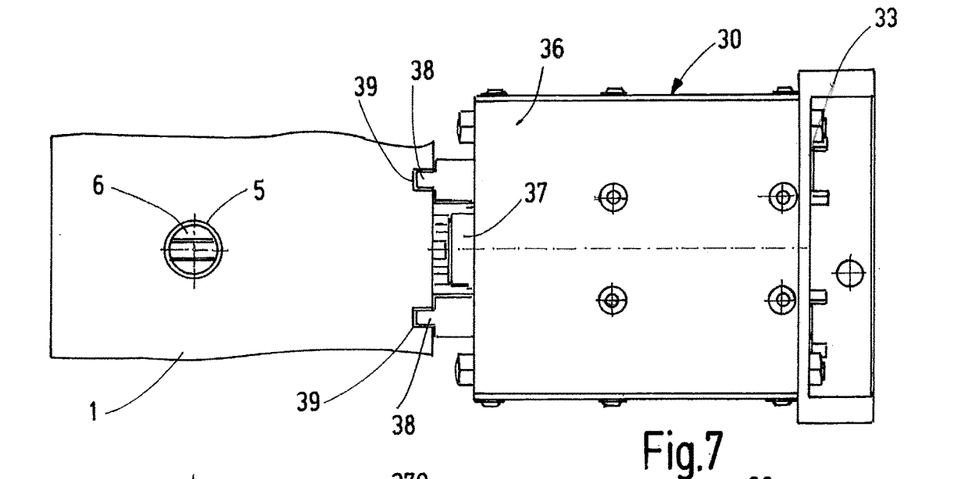

A gripping unit 30 that forms gripping means is moved to the housing 7 of the tool holder 3, wherein in the condition shown in FIG. 6, the tool holder 3 is still attached to the tool carrier 1. The gripper unit 30 comprises two parallel support plates 31, 32 and a reception or coupling plate 33 that are connected with each other with distance to each other by rods 34 and among which the coupling plate 33 is provided with a frame 35 that is preferably continuously provided along three sides and open to one side. For protection against external influences the whole gripper unit 30 is surrounded by a splash water proof housing 36, as apparent from FIGS. 7-9.

Two substantially L-shaped gripping jaws 370 are pivotably supported at the support plate 31 and extend from the front side, wherein a rotatably supported coupling piece 37 (FIG. 15) is present below the gripping jaws 370 that is symmetrically arranged relative to the gripping jaws 370. A torque support is assigned to and arranged distant from the coupling piece 37 that comprises two bars 38 that are orientated parallel to each other and have parallel flanks, wherein corresponding slit-like grooves 39 at the tool carrier 1 are assigned to the bars 38, as it is apparent from FIG. 7 for example.

Figure 10:
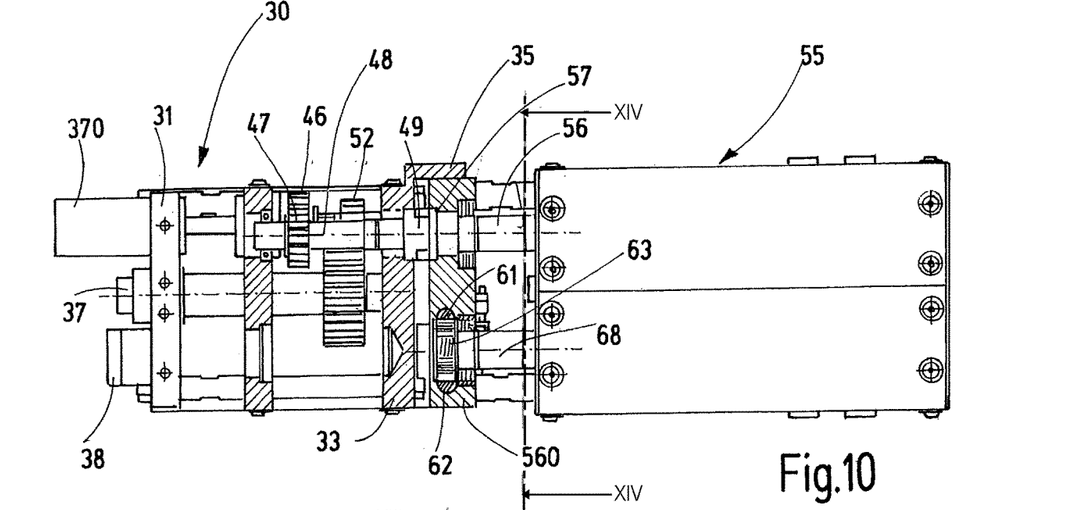
Figure 11:
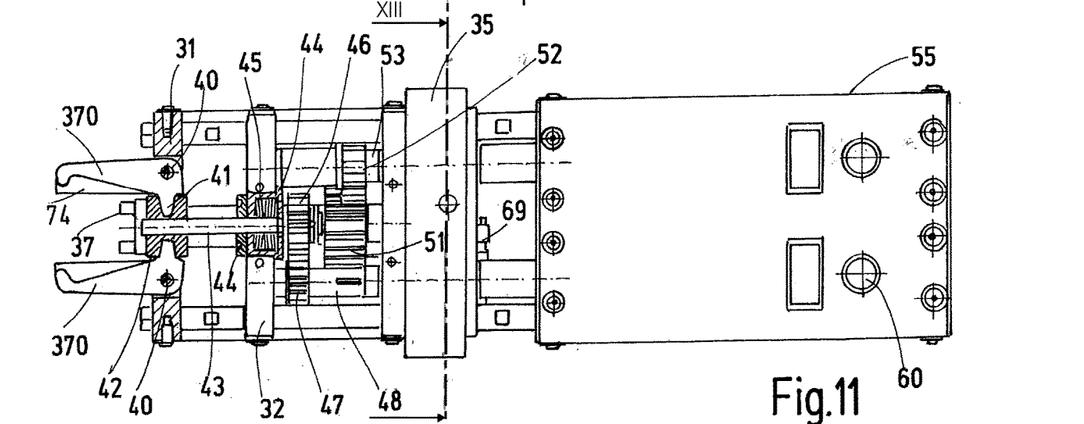
Figure 12:
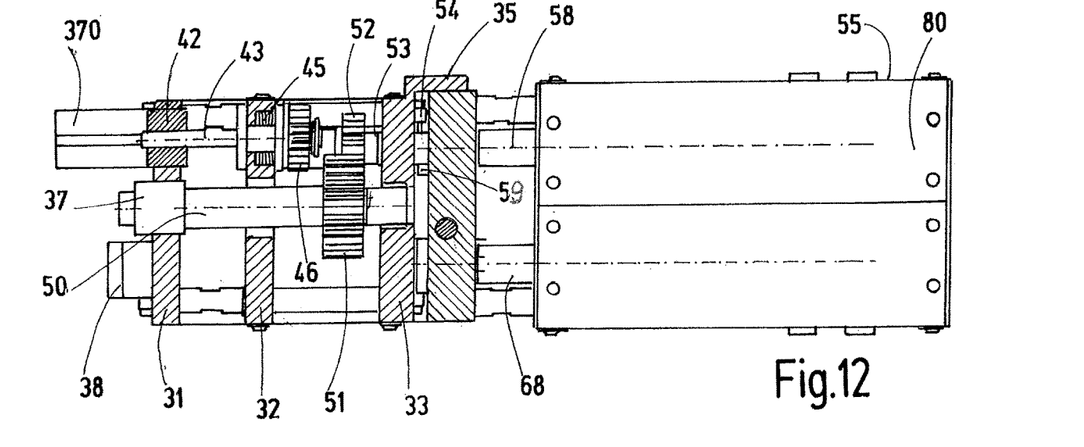

The constructive configuration of the gripper unit 30 is particularly illustrated in FIGS. 10-12:

The gripping jaws 370 that are pivotably supported toward each other and away from each other at numeral 40 at the support plate 31 engage in a clamping nut 42 that is slideably supported in the support plate 31 with one projection 41 respectively, wherein the clamping nut 42 is arranged on a threaded spindle 43 that is axially supported by support parts 44 and by a spring packet 45 against the support plate 32 and that is coupled with a gear 46 in a torque-proof manner. The gear 46 is engaged with a gear 47 that is seated on a shaft 48 that is rotatably supported in the support plate 32 and the coupling plate 33. The shaft 48 carries on one end a coupling piece 49 of a jaw coupling that is accessible from outside and placed within the frame 35 of the coupling plate 33. Due to a driving operation of the shaft 48 via the jaw coupling, the gripping jaws 370 can thus be moved toward or away from each other.

A coupling piece 37 is rotatably supported in the support plate 31 below the gripping jaws 370, wherein the coupling piece 37 serves to rotate the clamping screw 25 via the coupling piece 28. The coupling piece 37 is arranged in a torque-proof manner on a shaft 50 that carries a gear 51 (FIG. 12) that is engaged with a gear 52 that is coupled by a shaft 53 with a coupling piece 54. The coupling piece 54 is accessible at the front side of the coupling plate 33 and is arranged inside the frame 35 in a manner apparent from FIG. 6.

The couplings with the coupling pieces 28, 37, 49 and 54 are configured as jaw couplings respectively, the function of which is basically illustrated in FIG. 17. The arrangement is provided, such that the bar (e.g. the bar 29) that engages between the jaws has a free rotation angle area of about 16° before it engages the jaws of the assigned other coupling piece in a form-fit manner.

If the coupling elements 28, 37 are in engagement, the clamping screw 25 can be actuated for clamping or releasing by rotating the coupling piece 54.

A drive unit 55 is releasably connected with the described gripper unit 30 in a manner apparent from FIGS. 10-12. It forms drive means for actuating of the gripper means formed by the gripping jaws 370 of the gripper unit and the device for actuating the fastening means in form of the clamping screw 25. The two units 30, 55 are releasably connected with each other. For this purpose the drive unit 55 carries a fitting connection plate 560 that exactly fits in the frame 35 of the coupling plate 33. A drive shaft 56 with a jaw coupling piece 57 mating with the coupling piece 49 and a drive shaft 58 with a jaw coupling piece 59 mating with the coupling piece 54 are rotatably supported in the connection plate 560. The drive shafts 56, 58 are driven by not further illustrated gear motors that are arranged in the inside of the drive unit 55. The drive unit also comprises the control, feedback control and monitoring devices for the gear motors. It is provided with means 60 configured for attachment at a handling device, e.g. at an arm of a robot or at a compound slide.

Figure 13:
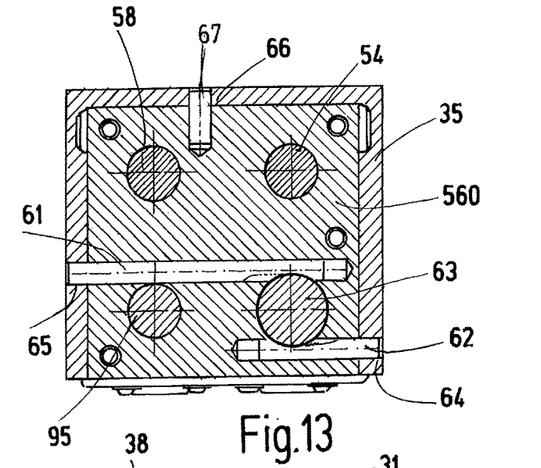

A locking mechanism in the coupling plate 560 serves for coupling the drive unit 55 with the gripper unit 30, the function of which is particularly apparent from FIGS. 6, 13.

In respective bores of the connection plate 560 two locking bolts 61, 62 are slideably arranged, each comprising a section having a toothing with which they are coupled with a gear 63, such that rotation of the gear 63 shifts the locking bolts 61, 62 in an opposite sense. Respective bores 64, 65 in the frame 35 of the gripper unit 30 are assigned to the locking bolts 61, 62. A bore 66 at the top side of the frame 35 orientated orthogonal to the bores 64, 65 is assigned thereto. The connection plate 560 is provided with a locating pin 67 that is aligned with the bore 66 in the assembled condition. The gear 63 is seated on the drive shaft 68 of a gear motor in the drive unit 55.

The coupling of the drive unit 55 with the gripper unit 33 is executed in a manner, such that the drive unit 55 is shifted inside the frame 35 of the coupling plate 33 from below with reference to FIG. 6, wherein the locating pin 67 is shifted inside the bore 66. Then the respective gear motor rotates the gear 63 via the drive shaft 68 with the result that the two locking bolts 61, 62 are shifted in their respective bores 64, 65 of the frame 35, whereby the connecting plate 560 of the drive unit 55 is connected exactly in the correct positional arrangement with the coupling plate 33 of the gripper unit.

In order to allow this coupling process, the jaw coupling pieces 49, 54 must be placed in the angular position shown in FIG. 6 parallel to the locating pin 67. Because each jaw coupling has a free movement play S of, e.g. 16° in the manner illustrated in FIG. 17, the pre-adjustment of the angular position of the jaw coupling pieces 49, 54 required for the coupling process is not excessively critical, which also applies for the jaw coupling of FIG. 16.

Figure 14:
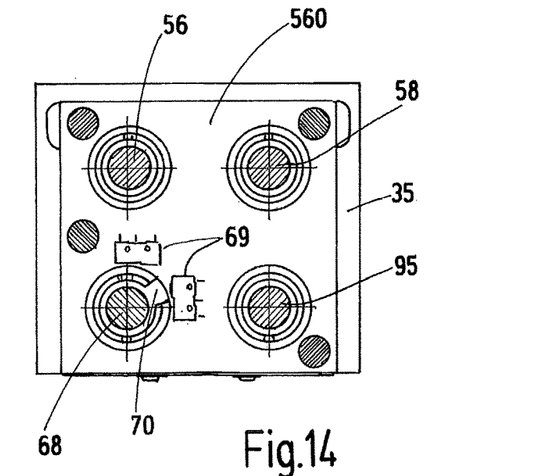

Rotation angle transmitters illustrated at numeral 69 are assigned to the drive shaft 68 of the gear 63, as shown in FIG. 14. The rotation angle transmitters 69 cooperate with a cam of the drive shaft 68 and influence the control of the assigned gear motor, such that the coupling bars on the side of the drive unit 55 and assigned to the coupling pieces 49, 54 are vertically orientated with reference to FIG. 6 in order to allow the insertion of the connection plate 560 in the frame 35 of the coupling plate 33.

In order to allow a reliable engagement of the gripping jaws 370 in the tool holder 3, gripping locations for the gripping jaws 370 are provided at its housing 7 or as in the present case at a plate 71 fixedly screwed to the housing 7.

These gripping locations for the gripping jaws 370 are configured as two parallel linear grooves 72 at opposite narrow sides of the plate 71 in which the gripping jaws 370 can engage, e.g. in a manner as apparent from FIG. 6. The grooves 72 are interrupted by two snap cutouts 73 in which ribs 74 provided at the gripping jaws 370 can engage, whereby it is guaranteed that the tool holder is held exactly in the correct positional arrangement by the gripping jaws 370, if they are closed.

Two respective longitudinal grooves 75 that are also parallel to each other are formed at the plate 71 orthogonal to the grooves 72 configured for accommodation of the gripping jaws 370, wherein the longitudinal grooves 75 are part of a device for positioning the tool holder 3 on a storage 76 (FIG. 18). Two positioning bolts 77 arranged standing upright on the storage 76 form part of this device. The positioning bolts 77 allow to position the stored tool holder 3 lying on one side by simple slide-in movement in a way, such that the grooves 72 configured for engagement of the gripping jaws 370 allow an unimpeded engagement of the gripping jaws 370.

The function is as follows:

As preparation step first the drive unit 55—arranged in a splash water proof housing 80 according to the embodiment—is approached by a handling device, e.g. a robot to a gripper unit 30 suitable for the respective application and coupled thereto in the already described manner, wherefore a gear motor present in the drive unit 55 operates the gears 63 in a locking sense. Different gripper units 30 can be coupled that are adapted to the respective requirements of the individual machine tool type, embodiment of the tool holder and the conditions of the intended use, because the gripper unit 30 and the drive unit 55 are automatically releasably and lockably coupled with each other at an interface. The tool carrier 1 is rotated in an angular position in which the tool holder 3 that is to be replaced is placed in a pre-defined position that is suitable for this purpose. Then a common unit consisting of the units 30, 55 is moved in this position by the handling device in which the tool holding change shall be executed. The gripper unit 30 moves with the two bars 38 of the torque support in the assigned grooves 39 of the tool carrier 1 (FIG. 7) and thereby effects a pre-centering of the gripper unit 30 relative to the tool holder 3. During the progress of the further forward movement of the gripper unit 30 its coupling piece 37 engages the coupling bar 29 of the coupling piece 28 of the clamping screw 25, whereby the two coupling pieces 28, 37 are aligned with each other on a common symmetry line and the opened gripping jaws 370 are placed lateral adjacent gripping locations of the plate 71 of the tool holder 3. Then the respective gear motor in the drive unit 55 drives the threaded spindle 43 (FIG. 11) in the already described manner with the consequence that the gripping jaws 370 engage in the lateral grooves 72 of the plate 71 and are clamped therewith (FIG. 6). Because the threaded spindle 43 is axially elastically supported by means of the disc spring packet 45 and comprises a self-locking thread, the gripping jaws 370 rest in their clamped position without the need to further control the thread motor of the drive unit 55 operating the gripping jaws 370.

Subsequently, the assigned gear motor of the drive unit 55 drives the clamping screw 25 in a release sense via the shaft 50 and the coupling pieces 28, 37, whereby the clamping bar 24 is lifted from the tool carrier 1 and the two clamping rods 21 connected therewith are retracted in the released position according to FIG. 4 in a manner that was also already explained. The gear motor rotates the coupling piece 37 in a position in which the coupling bar 29 with is positioned orthogonal to the drawing plane of FIG. 9, that is parallel to the shaft 6 of the tool holder 3, whereby the tool holder 3 can be removed from the reception bore 4 of the tool carrier 1 and can be moved to a storage 76 (FIG. 18) and can be put down there by the handling device that engages the units 30, 55. For putting down a tool holder 3 it is turned about 90° by the handling device and is shifted between the positioning bolts 77 with its grooves 75 that serve for its positioning, whereby the tool holder is retained at the positioning bolts 77 on the storage 76 in a fixed positional arrangement in an exactly defined orientation.

Subsequently, the gripping jaws 370 are released by a respective operation of the threaded spindle 43, such that the gripping means are available for a subsequent task and can grip another tool carrier 3 that is also held on the storage in correct positional arrangement at the gripping positions formed by the grooves 72 and can move it toward the tool carrier 1.

During insertion the tool holder 3 is first aligned with its shaft 6 on the assigned reception bore 4 of the tool carrier 1 and then placed with its contact surface 12 on the contact surface 2 of the tool carrier 1, wherein the bars 38 of the torque support engage in the assigned grooves 39 of the tool carrier and the coupling pieces 37, 28 of the jaw coupling come into engagement with each other. Then the clamping screw 25 is tightened via the shaft 50 and the coupling piece 37, whereby the clamping rods 21 are pushed forward in the clamped position according to FIG. 5 and the tool holder 3 is clamped on the tool carrier 1 in the correct positional arrangement. The inclination of the thread of the clamping screw 25 is selected, such that wear occurring during releasing or clamping is minimized. If necessary, the axial movement path of the clamping screw 25 during releasing or clamping can be absorbed by supporting the shaft 50 in the supporting plates 31, 33 (FIG. 12) that carries the coupling piece 37 in a manner to be longitudinally shiftably within limits or by providing the coupling piece 37 with a respective axial length.

The substantial steps of the processes described above during tool change are schematically obviously illustrated in FIGS. 19-22:

A Handling device in the form of a robot 93 is assigned to the schematically illustrated machine tool 90 that has, e.g. the form of a CNC center comprising a working spindle 91 arranged in a working space 92. The robot 93 comprises a moveable arm 94 that carries the drive unit 55 rotatably supported thereon, that in turn is coupled with a gripping unit 30 in the manner already described. In the first step illustrated in FIG. 19 the moveable arm 94 of the robot 93 has moved the two units 30, 55 coupled with each other to the tool carrier 1 formed by a star turret disc and the gripping jaws 370 have been brought into engagement with the tool holder 3.

Figure 20:
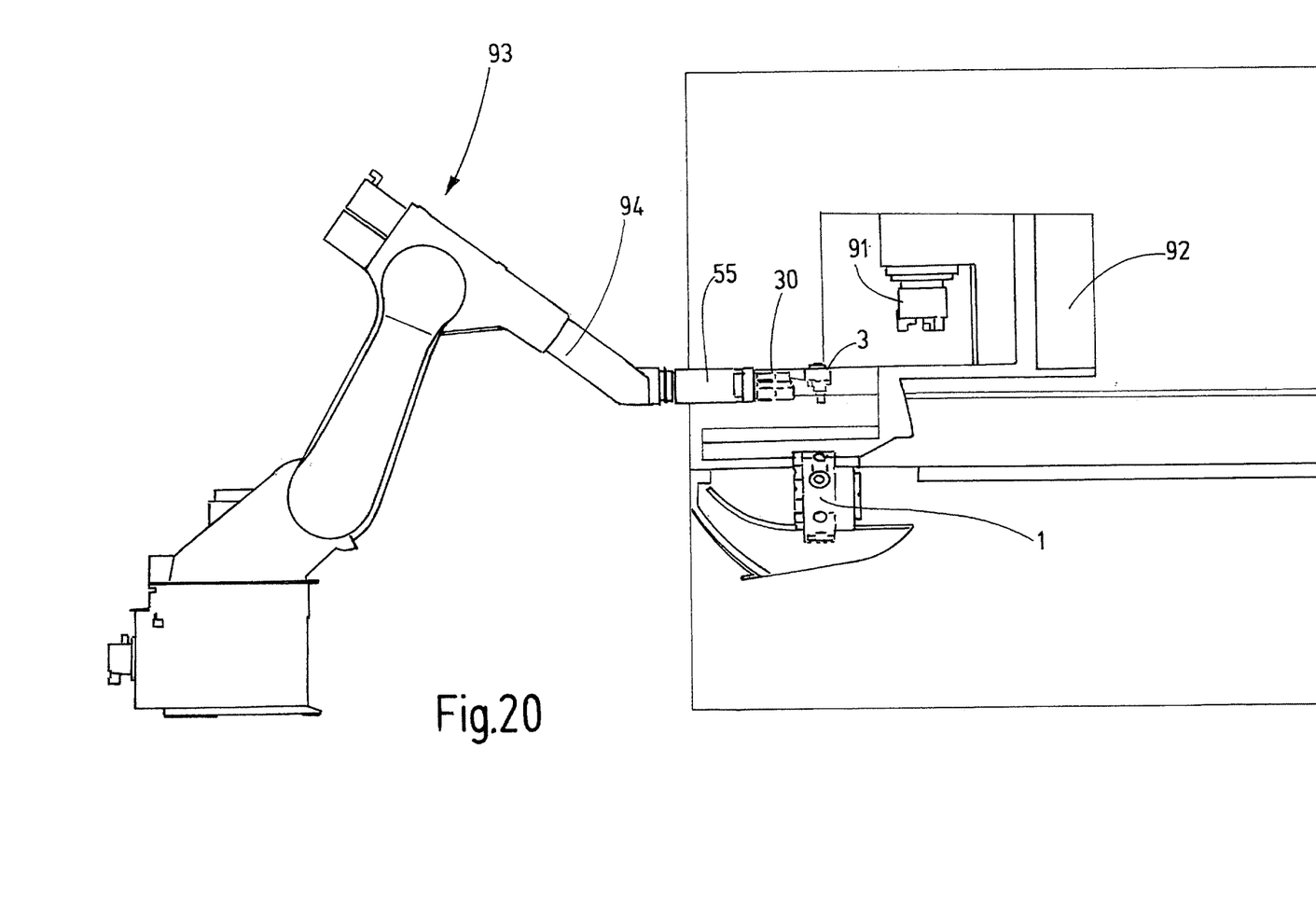

In the condition according to FIG. 20 the gripping unit 30 has released the tool holder 3 from the tool carrier 1 and lifted tool holder 3 in the working space 92.

Figure 21:
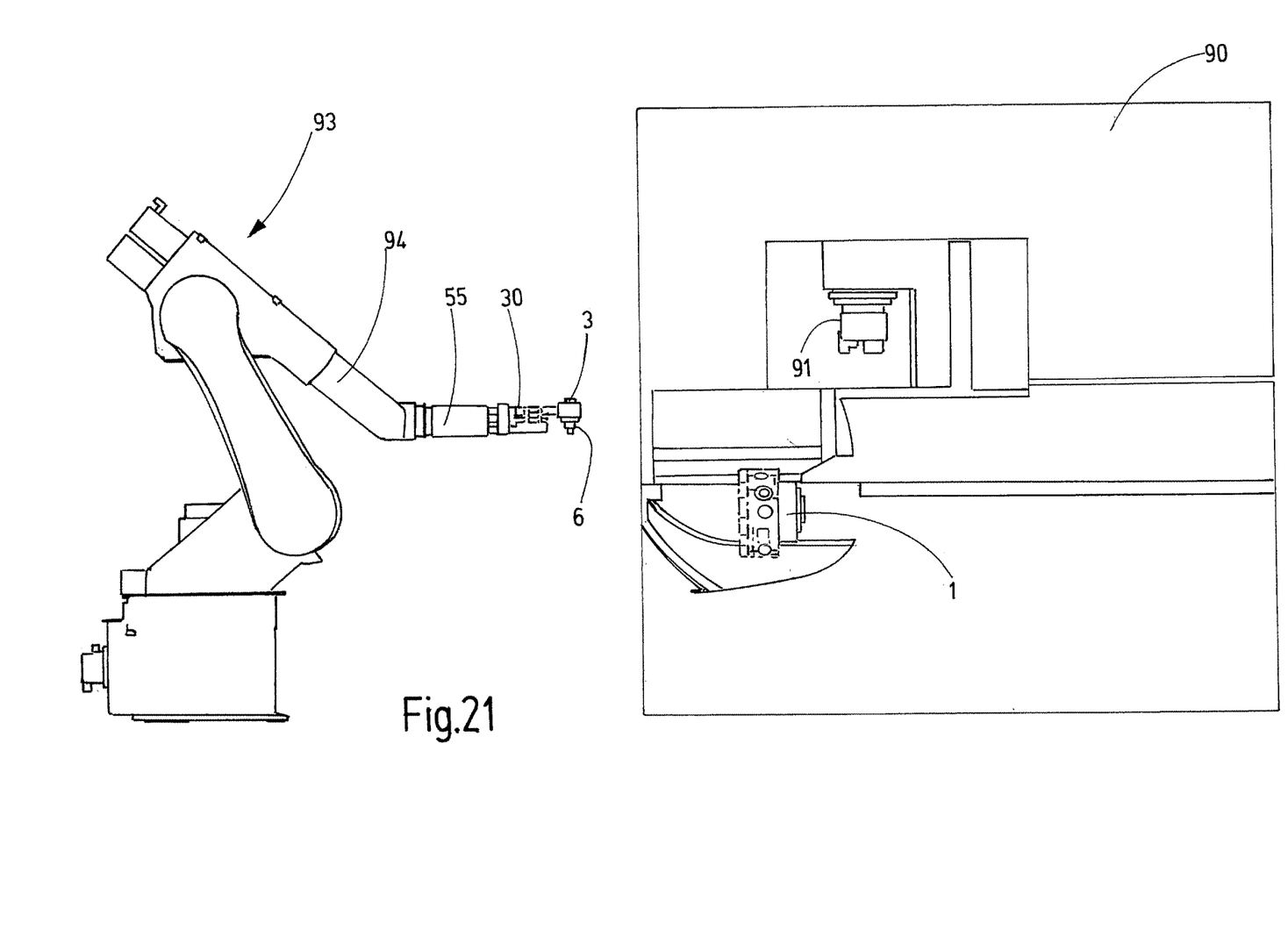

The released tool holder 3 is removed from the working space 92 in FIG. 21 and thus can be freely moved in the space.

Figure 22:
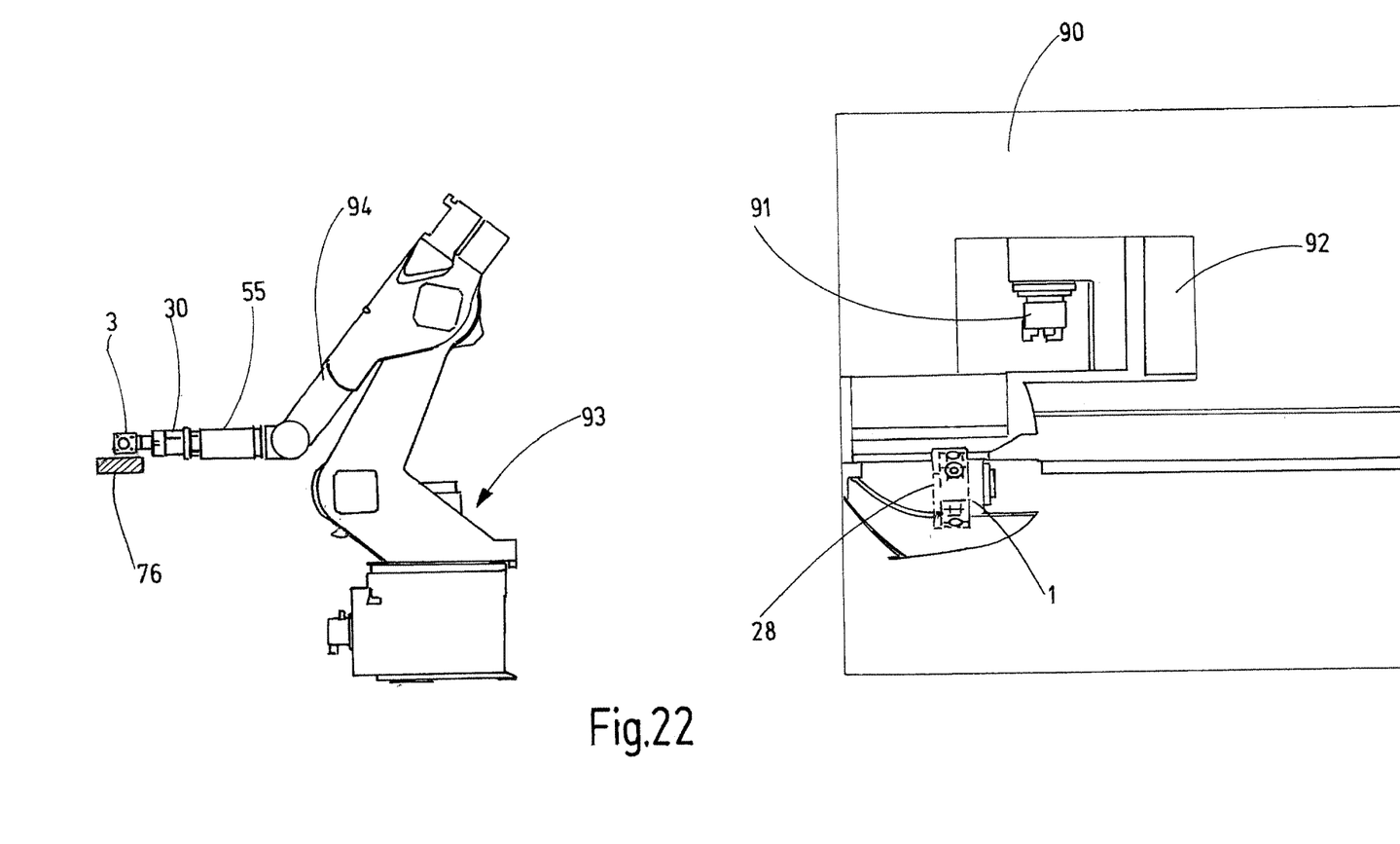

In FIG. 22 finally the condition is illustrated in which the robot 93 has put down the tool holder 3 on the storage 76 of a not further illustrated magazine in a manner illustrated in FIG. 18, such that a gripper unit 30 can release the tool holder 3 in the subsequent step and can turn to tool holder that is to be inserted subsequently.

After putting down the tool holder 3 on the storage 76 the gripper unit 30 can be separated from the drive unit 55 at its interface, if necessary, and can be replaced by another gripper unit. Instead of the gripper unit also a unit configured to carry out another or an additional function can be coupled with the drive unit 55. For example, a cleaning unit with a vacuum cleaner duct can be mounted instead of the gripper unit, only to mention one possibility.

In the described embodiment the drive unit 55 comprises three controllable gear motors that can be individually controlled and that drive the shafts 56, 58 and 68. The drive unit 55 can also comprise additional further drive sources that are coupled in a respective manner via jaw couplings with functional units of the gripper unit. This is illustrated in FIGS. 13, 14 by means of a fourth drive shaft 95.

The new tool change device was discussed above with reference to a tool holder clamping system that requires only one single clamping screw for each tool holder and that is substantially described in DE 10 2014 119 482 A1. The invention is not limited to this clamping system. It can also be used with other clamping systems, e.g. those that use two or more fastening screws that extend through a respective flange of the tool holder housing and/or comprise otherwise configured gripping locations for the gripping jaws for fastening a tool holder on an assigned tool carrier. In such cases the gripping means and the devices for actuating the fastening means have to be adapted accordingly to the respective present circumstances, which usually does not create difficulties. This applies to the same degree also for clamping systems in which the fastening means engage a shaft of the tool holder.

The tool holder magazine comprising the storage 76 can be located directly at the machine tool or centrally in the production. The tool holders are equipped and measured in a tool pre-adjustment. According to the invention, the determined values can be stored, e.g. in an RFID chip 96 (FIGS. 1, 2) that is attached to the tool holder 3 and that is moved together therewith to the storage 76 in the magazine or directly to the tool carrier 1. At the tool carrier 1 in the area of the contact surface 2 an assigned RFID transmitter/receiver is arranged that communicates with the chip 96 of a mounted tool holder 3 and that can transmit respective information, particularly wirelessly, e.g. to a monitoring device. In doing so, a fully automatic control of the tool change process including the automatic monitoring of the pre-adjustment and the storage of the tool holders in the magazine is possible. Each of the tool holders 3 is individually detected with its characteristics, while it is concurrently guaranteed that the correct tool holder is employed at the correct location of the tool carrier.

The invention claimed is:

1. A machine tool, comprising:
a rotatable tool turret (1) that comprises a plurality of receptacles (4) that are circumferentially spaced from one another,
a tool holder (3), wherein the tool holder (3) is inserted in a one of the plurality of receptacles (4) with a pre-defined orientation and is releasably fastened at the tool turret (1) in a correct positional arrangement, wherein the tool holder (3) comprises a housing (7) to which fastening means (21, 24, 25) are assigned, wherein the fastening means (21, 24, 25) are configured to fasten the tool holder (3) at the tool turret (1),
a driven tool (11) or a stationary tool (11) that is clamped in the tool holder (3),
a tool change device that comprises gripping means (370, 42, 43) configured for gripping the tool holder (3) at the housing (7) or at a part (71) connected therewith, wherein the tool change device is configured to replace the tool holder (3), after the tool holder (3) is released from the tool turret (1), with another tool holder (3) and is further configured to insert the another tool holder (3) in the correct positional arrangement in the one of the plurality of receptacles (4),
wherein the tool change device further comprises a drive unit (55) in which a plurality of motors are arranged, one of the plurality of motors driving a corresponding first drive shaft (58) for actuating the fastening means (21, 24, 25) and another one of the plurality of motors driving a corresponding second drive shaft (56) for actuating the gripping means (370, 42, 43).

2. The machine tool according to claim 1, wherein the fastening means (21, 24, 25) are configured to be actuable at an outer side of the tool turret (1).

3. The machine tool according to claim 1, wherein the gripping means are integrated in a gripper unit (30).

4. The machine tool according to claim 3, wherein the one of the plurality of motors driving the corresponding first drive shaft (58) is a first gear motor and the another one of the plurality of motors driving the corresponding second drive shaft (56) is a second gear motor, wherein the drive and gripper units (30, 55) are connected with each other.

5. The machine tool according to claim 4, wherein the drive and gripper units (30, 55) are releasably connected with each other.

6. The machine tool according to claim 3, wherein at least one of the drive and gripper units (30, 55) is configured to be releasably coupled with a handling device.

7. The machine tool according to claim 1, wherein the gripping means (370, 42, 43) are configured to be mechanically operable.

8. The machine tool according to claim 7, wherein the fastening means (21, 24, 25) are actuatable by the first drive shaft (58) via first gear means (51, 52), and the gripping means comprise gripping jaws (370) that are actuable by the second drive shaft (56) via second gear means (44, 46, 47).

9. The machine tool according to claim 1, wherein the fastening means (21, 24, 25) comprise at least one rotatably supported actuating screw (25), and the at least one rotatably support actuating screw (25) is coupled with a rotatable coupler (28) and with the first drive shaft (58).

10. The machine tool according to claim 9, wherein a torque support (38, 39) is assigned to the rotatable coupler (28).

11. The machine tool according to claim 1, wherein readable identification means (96, 97) are assigned to the tool holder (3) and the tool turret (1), wherein the readable identification means (96, 97) allow a pre-defined assignment of the tool holder (3) to the one of the plurality of receptacles (4) to be determined.

* * * * *